United States Patent
Kang et al.

(10) Patent No.: US 9,207,768 B2
(45) Date of Patent: Dec. 8, 2015

(54) METHOD AND APPARATUS FOR CONTROLLING MOBILE TERMINAL USING USER INTERACTION

(71) Applicant: Samsung Electronics Co., Ltd., Gyeonggi-do (KR)

(72) Inventors: Hwa-Yong Kang, Gyeonggi-do (KR); Young-Sam Yu, Gyeonggi-do (KR); Eun-Soo Chang, Seoul (KR)

(73) Assignee: Samsung Electronics Co., Ltd (KR)

( * ) Notice: Subject to any disclaimer, the term of this patent is extended or adjusted under 35 U.S.C. 154(b) by 153 days.

(21) Appl. No.: 13/736,540

(22) Filed: Jan. 8, 2013

(65) Prior Publication Data
US 2013/0194184 A1 Aug. 1, 2013

(30) Foreign Application Priority Data
Jan. 31, 2012 (KR) .................. 10-2012-0009882

(51) Int. Cl.
| | |
|---|---|
| *G06F 3/01* | (2006.01) |
| *H04N 5/345* | (2011.01) |
| *H04N 5/232* | (2006.01) |
| *H04N 5/343* | (2011.01) |
| *H04N 5/378* | (2011.01) |

(52) U.S. Cl.
CPC ............ *G06F 3/017* (2013.01); *H04N 5/23219* (2013.01); *H04N 5/23241* (2013.01); *H04N 5/23245* (2013.01); *H04N 5/343* (2013.01); *H04N 5/345* (2013.01); *H04N 5/378* (2013.01)

(58) Field of Classification Search
CPC .... H04N 5/345; H04N 4/23219; G06F 3/013; G06F 3/017; G06F 3/0304; G06F 3/042; G06K 9/00355
See application file for complete search history.

(56) References Cited

U.S. PATENT DOCUMENTS

| | | | |
|---|---|---|---|
| 7,302,089 B1 | 11/2007 | Smits | |
| 2005/0046723 A1* | 3/2005 | Bean et al. | ..... 348/315 |
| 2005/0286743 A1* | 12/2005 | Kurzweil et al. | ..... 382/114 |
| 2007/0150827 A1* | 6/2007 | Singh et al. | ..... 715/773 |
| 2008/0158396 A1* | 7/2008 | Fainstain et al. | ..... 348/246 |
| 2009/0180012 A1 | 7/2009 | Ino | |
| 2009/0325493 A1* | 12/2009 | Suzuki | ..... 455/41.3 |
| 2010/0073294 A1 | 3/2010 | Kim et al. | |
| 2010/0085171 A1* | 4/2010 | Do | ..... 340/426.1 |
| 2010/0141762 A1* | 6/2010 | Siann et al. | ..... 348/143 |

(Continued)

FOREIGN PATENT DOCUMENTS

| | | |
|---|---|---|
| EP | 2 237 551 | 10/2010 |
| JP | 2006093934 | 4/2006 |

(Continued)

*Primary Examiner* — Sanjiv D Patel
(74) *Attorney, Agent, or Firm* — The Farrell Law Firm, P.C.

(57) ABSTRACT

A method and apparatus for controlling a mobile terminal through use of user interaction are provided. The method includes operating in a vision recognition mode that generates a vision recognition image through use of a signal output from a second plurality of pixels designated as vision pixels from among a plurality of pixels of an image sensor included in the mobile terminal; determining whether a predetermined object in the vision recognition image corresponds to a person; determining a gesture of the predetermined object when the predetermined object corresponds to the person; and performing a control function of the mobile terminal corresponding to the gesture of the predetermined object.

14 Claims, 2 Drawing Sheets

(56) References Cited

U.S. PATENT DOCUMENTS

| | | |
|---|---|---|
| 2010/0158371 A1 | 6/2010 | Jung et al. |
| 2011/0115915 A1* | 5/2011 | Velusamy .................... 348/158 |
| 2011/0134250 A1 | 6/2011 | Kim et al. |
| 2011/0256886 A1* | 10/2011 | Velusamy ................. 455/456.1 |
| 2012/0242684 A1* | 9/2012 | Kim .............................. 345/619 |
| 2013/0141597 A1* | 6/2013 | Lee et al. ................. 348/207.11 |
| 2015/0035746 A1* | 2/2015 | Cockburn et al. ............. 345/156 |

FOREIGN PATENT DOCUMENTS

| | | |
|---|---|---|
| JP | 2009-272820 | 11/2009 |
| KR | 1020080074684 | 8/2008 |

* cited by examiner

METHOD AND APPARATUS FOR CONTROLLING MOBILE TERMINAL USING USER INTERACTION

PRIORITY

This application claims priority under 35 U.S.C. §119(a) to an Application filed in the Korean Intellectual Property Office on Jan. 31, 2012 and assigned Serial No. 10-2012-0009882, the entire disclosure of which is incorporated herein by reference.

BACKGROUND OF THE INVENTION

1. Field of the Invention

The present invention relates generally to vision recognition, and more particularly, to a method and apparatus for controlling a mobile terminal through use of user interaction recognized by vision recognition.

2. Description of the Related Art

Communication technologies have recently been developing more rapidly and, as a result, the functions of mobile terminals have expanded. Accordingly, more various User Interfaces (UIs) and various functions using the same have been provided. Moreover, the mobile terminal provides various input schemes to control the various functions.

To use the various functions through the mobile terminal, the user control these functions by inputting keys included in the mobile terminal. Further, a mobile terminal which includes a touchscreen controls the mobile terminal through touch inputting with respect to a predetermined area of the touchscreen. Thus, the mobile terminal is controlled by directly providing an input by using particular input devices for controlling the mobile terminal.

However, as described in the foregoing, each function provided by the mobile terminal is controlled through key or touchscreen input. Therefore, controlling each function of the mobile terminal is limited to key or touchscreen input. Moreover, controlling each function is simple in that each function is controlled by using an uniform input scheme, such as key or touchscreen input.

A scheme of inputting information in addition to direct inputting by a user includes a vision recognition scheme. The vision recognition scheme refers to a scheme that extracts image information from a captured image and utilizes the extracted information as information for the user interface. For example, a screen of a display device is changed based on the movement of a hand, which is an example of the vision recognition scheme.

SUMMARY OF THE INVENTION

To enable an operation desired by a user to be performed in a mobile terminal, only a hardware User Interface (UI) has been used, such as a keypad, a touchscreen, and the like. Also, a vision recognition scheme extracts vision recognition information from a captured image. Accordingly, vision recognition information is extracted from optical information including a large number of pixels, some of which are not necessary and an operation time increases as a result, causing power consumption to increase. Thus, a mobile terminal needlessly uses its battery excessively in using vision recognition as an interface of the mobile terminal.

When the mobile terminal is controlled by a vision recognition scheme with lower power consumption, without direct input by the user, the user's experience is improved.

Accordingly, an aspect of the present invention is to solve the above-mentioned problems, and to provide a method and apparatus for controlling a mobile terminal through the use of a vision recognition scheme with low power consumption, without direct input by a user.

Another aspect of the present invention is to provide a method and apparatus for controlling a mobile terminal by recognizing a gesture of a user.

Another aspect of the present invention is to provide a method and apparatus for reporting the occurrence of an event to an authenticated user when an event occurs in a mobile terminal.

Another aspect of the present invention is to provide a method and apparatus for performing a function of inputting between a user and a mobile terminal, a function of recognizing a circumstance, and the like, with low power consumption.

In accordance with an aspect of the present invention, a method of controlling a function of a mobile terminal through use of user interaction in the mobile terminal is provided. The method includes The method includes operating in a vision recognition mode that generates a vision recognition image through use of a signal output from a second plurality of pixels designated as vision pixels from among a first plurality of pixels of an image sensor included in the mobile terminal; determining whether a predetermined object in the vision recognition image corresponds to a person; determining a gesture of the predetermined object when the predetermined object corresponds to the person; and performing a control function of the mobile terminal corresponding to the gesture of the predetermined object.

In accordance with another aspect of the present invention, a mobile terminal for controlling a function of the mobile terminal through use of user interaction is provided. The mobile terminal includes an image sensor in which a second plurality of pixels of the entire pixels of a captured image are designated as vision pixels; a vision recognition processor for detecting and recognizing a predetermined object included in a vision recognition image generated through use of signals output from the few pixels designated as vision pixels from among a first plurality of pixels of the image sensor when a vision recognition mode is operated; and a controller for determining whether the predetermined object included in the vision recognition image corresponds to a person based on a result of the recognition of the vision recognition processor, determining a gesture of the predetermined object when the predetermined object corresponds to a person, and performing a control function of the mobile terminal corresponding to the gesture of the predetermined object.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
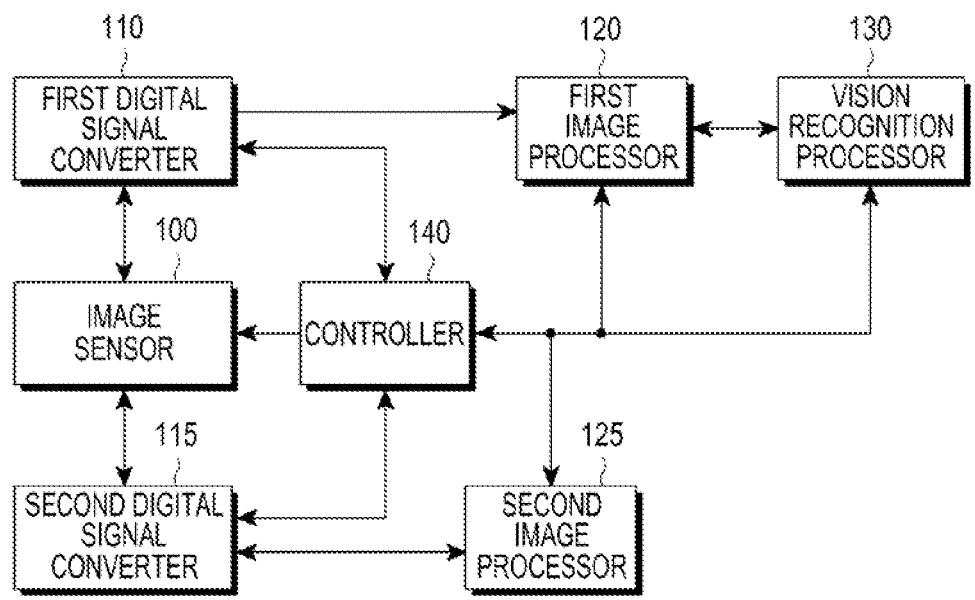
FIG. 1 is a block diagram illustrating a configuration of a mobile terminal according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention provides a method and apparatus for controlling a mobile terminal through use of user interaction. To achieve this result, embodiments of the present invention designate a plurality of pixels of an image sensor for capturing an image, as vision pixels for vision recognition, may recognize user interaction based on information from the vision pixels, and controls a function of the mobile terminal corresponding to the recognized user interaction. Therefore, user interaction is recognized through the vision recognition at a low cost, and the mobile terminal is controlled without direct input by a user.

Before describing embodiments of the present invention, a brief description associated with the image sensor for the vision recognition will be provided.

In general, the mobile terminal requires a large amount of image pixel information to detect user interaction associated with a gesture of the user, used as a as a User Interface (UI) of the mobile terminal. In this instance, the mobile terminal needs to process a large amount of pixel information and, thus, the operation time and power consumption increases. Therefore, taking this drawback into consideration, a method of recognizing the gesture of the user with low power consumption is desired.

To accomplish this, embodiments of the present invention provide an image sensor that is capable of detecting a gesture of the user, and has low power consumption and a high operation processing speed.

Embodiments of the present invention designate, as vision pixels, a plurality of pixels of a general image sensor for capturing an image, use optical information obtained from the vision pixels, for vision recognition in a vision recognition mode, and generates image data through use of optical information obtained from all pixels of the image sensor in an imaging mode. In this example, the number of pixels designated as vision pixels is greater than or equal to a minimum number of pixels required for normal vision recognition.

An image associated with a general picture, a moving picture for a purpose of recording, or a preview image is referred to as a captured image, and an image that is generated for vision recognition or used in vision recognition is referred to as a vision recognition image.

With reference to FIG. 1, a configuration and operations of the mobile terminal equipped with the image sensor will be described.

Referring to FIG. 1, the mobile terminal includes an image sensor 100, a first digital signal converter 110, a second digital signal converter 115, a first image processor 120, a second image processor 125, a vision recognition processor 130, and a controller 140. Although components associated with embodiments of the present invention are illustrated in FIG. 1, the mobile terminal includes other components such as a memory, a display unit, and the like. Examples of the mobile terminal includes a portable phone, a Personal Computer (PC), a notebook, a digital sound source playback device, a Portable Multimedia Player (PMP), and the like.

The first digital signal converter 110, the first image processor 120, and the vision recognition processor 130 correspond to components to generate a vision recognition image and perform vision recognition through use of the vision recognition image. The second digital signal converter 115 and the second image processor 125 correspond to components to generate a captured image.

When light enters into an optical electric conductor through a color filter, the image sensor 100 converts the light to a voltage signal of a level that is subjected to signal processing. The image sensor 100 outputs the voltage signal of a level. The image sensor 100 is used as a unit pixel, and an image sensor array, in which a plurality of image sensor pixels are aligned in predetermined rows and columns, is used.

Figure 2:
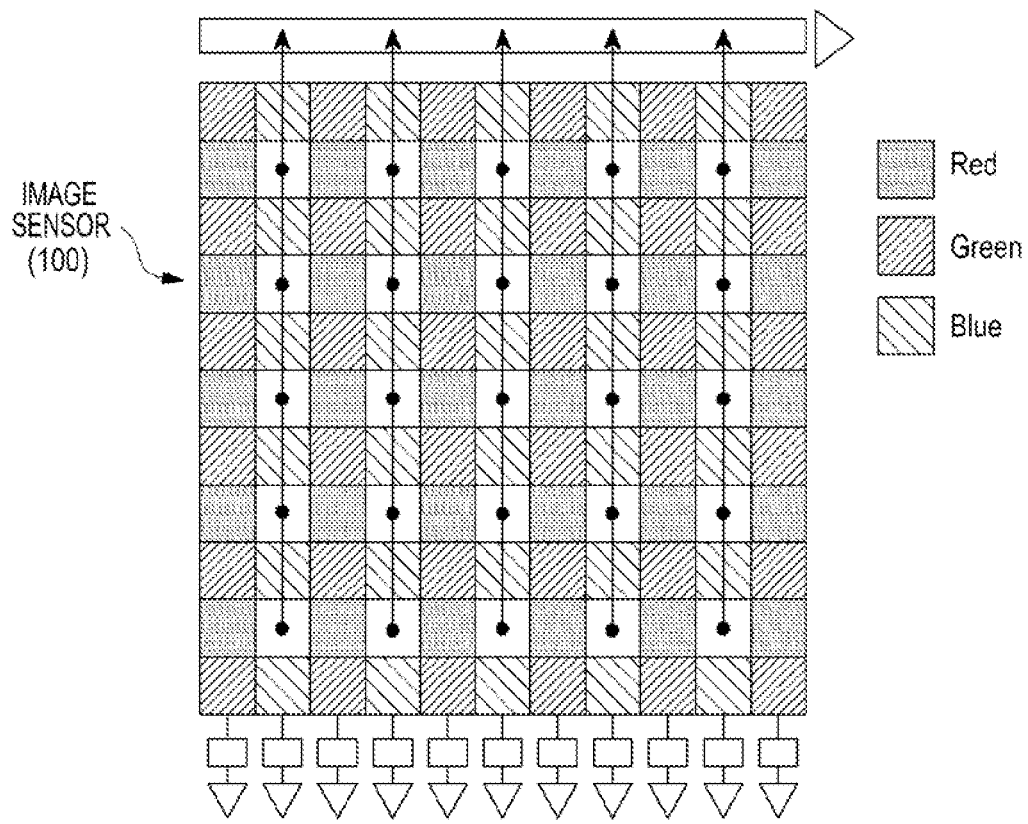
FIG. 2 illustrates a configuration of an image sensor according to an embodiment of the present invention.

The image sensor 100 includes a color filter of a Bayer pattern that embodies light received by a lens to be an original natural color, and FIG. 2 corresponds to a top view of the image sensor 100. To generate an image formed of points by collecting brightness and a color of an object, filters that receive the brightness of Red (R), Green (G), and Blue (B) is arranged on a two-dimensional plane, which is referred to as a Bayer pattern color filter. Pixels that form a lattice network in the Bayer pattern color filter recognize an assigned color from among R, G, and B, as opposed to recognizing all natural colors, and interpolate the recognized color so as to infer a natural color.

Signals output from a plurality of pixels forming the image sensor 100 are input to the second digital signal converter 115. In an imaging mode, an analog signal including optical information of the image sensor 100 is converted into a digital signal through the second digital signal converter 115, and is output to the second image processor 125. The second image processor 125 performs signal processing to generate an image captured by a gesture of a user, and outputs the processed signal to the controller 140.

A subset of the plurality of pixels are designated as vision pixels, and signals output from the vision pixels are input to the first digital signal converter 110, in addition to the second digital signal converter 115.

Accordingly, in a vision recognition mode, the analog signal including the optical information of the image sensor 100 is converted into a digital signal through the first digital signal converter 110, and is output to the first image processor 120. The first image processor 120 generates a vision recognition image based on a vision image format, and outputs the vision recognition image to the vision recognition processor 130.

The vision recognition processor 130 processes the vision recognition image obtained from the first image processor 120, and performs a vision recognition function. In particular, the vision recognition processor 130 detects and recognizes a predetermined object or a gesture of the predetermined object, and outputs a recognized result value to the controller 140.

The vision pixels are pixels to be used for generating an image to be used for vision recognition, and a number of pixels designated as the vision pixels are greater than or equal to a minimum number of pixels required to generate a vision image for normal vision recognition. According to embodiments of the present invention, any pixel of the plurality of pixels forming the image sensor 100 is designated as the vision pixels.

Since vision recognition processing detects and recognizes a predetermined object included in an image, the vision recognition image used in the vision recognition processing need not be represented by original natural colors, and, is generated in a way that enables an object to be readily detected and recognized. Accordingly, it is more effective that the vision pixel is configured to have a high sensitivity even at a low illuminance.

For example, the vision pixels are composed of green pixels that have a relatively high sensitivity from among pixels that receive the brightness of R, G, and B. As another example, the vision pixels are composed of white pixels that have a high sensitivity. The white pixel is embodied by removing a color filter of a corresponding pixel in a Bayer pattern.

FIG. 2 illustrates an image sensor array of the image sensor 100 when a white pixel is used as a vision pixel. Referring to FIG. 2, the image sensor array is composed of a red pixel, a green pixel, a blue pixel, and a white pixel. In an imaging mode, an output value of each of the red pixel, the green pixel, and the blue pixel is input to the digital signal processor 110. In a vision recognition mode, only an output value of the white pixel is input to the digital signal processor 110.

The controller 140 sets an operating parameter corresponding to the vision recognition mode or the imaging mode, for the image sensor 100, and the image sensor 100 operates based on the set operating parameter. The vision recognition mode is a mode for vision recognition based on a high sensitivity, a low power, a low pixel, a low bit Analog-Digital-Converter (ADC), and the like. A vision recognition image in the vision recognition mode is used for recognizing the existence of a user, the gesture of a user, and the like. Conversely, the image mode is a mode for capturing of an image and facial recognition based on a high quality, a high pixel, a high bit ADC, and the like. The captured image in the imaging mode is used for high level detection, facial recognition, and the like.

When the controller 140 receives, from the vision recognition processor 130, a result of detecting and recognizing a predetermined object or a gesture of the predetermined object from the vision recognition image, the controller 140 controls a predetermined function corresponding to the result. In particular, when the predetermined object in the vision recognition image is determined to correspond to a person based on the recognition result of the vision recognition processor 130, the controller 140 determines the gesture of the object. Subsequently, when the gesture of the user is detected, the controller 140 controls such that a function of the mobile terminal corresponding to the gesture of the user is performed. The gesture of the user corresponds to the shape of a hand, a direction of a face, and the like, and the gesture of the user is classified based on a predetermined definition, and is used as an input for the mobile terminal. For example, since a direction of the face of the user and the like is discerned based on the gesture of the user and, thus, whether the user gazes at a screen of the mobile terminal is recognized.

In this example, embodiments of the present invention determine whether the user exists in a range of the vision of the mobile terminal first, so as to use the movement of the user as an input for controlling the mobile terminal without direct inputting by the user. Accordingly, when it is determined that the user exists in the range of the vision of the mobile terminal, based on the recognition result of the vision recognition processor 130, in the vision recognition mode, that is, when the predetermined object detected from the vision recognition image corresponds to a person, whether the gesture of the predetermined object corresponds to a gesture predetermined for controlling a function of the mobile terminal is determined. When the gesture of the predetermined object corresponds to the predetermined gesture, the controller 140 performs a predetermined function of the mobile terminal corresponding to the predetermined gesture.

According to embodiments of the present invention, when it is determined that the user performs a gesture of looking at a screen of the mobile terminal, contents of an event occurring in response to the gesture are output on the screen. In this example, to report the contents of the event to an authenticated user, embodiments of the present invention determines whether the user is one who is authorized to use the mobile terminal. To perform this determination, the vision recognition mode is converted into the imaging mode, and high level detection and user-face recognition is performed. An image to be used for facial recognition for user authentication needs to be high definition and, thus, embodiments of the present invention convert the vision recognition mode into the imaging mode so as to generate a captured image with a high-definition.

However, when the user does not exist in the range of the vision of the mobile terminal, the vision recognition mode is periodically operates to reduce power consumption. In this example, a period of operating the vision recognition mode varies based on a variance of an image or a predetermined period.

Hereinafter, when the user performs a gesture of looking at the screen of the mobile terminal, as described in the foregoing as an example of a gesture of the user, operations of the mobile terminal in response to the gesture will be described with reference to FIG. 3.

Figure 3:
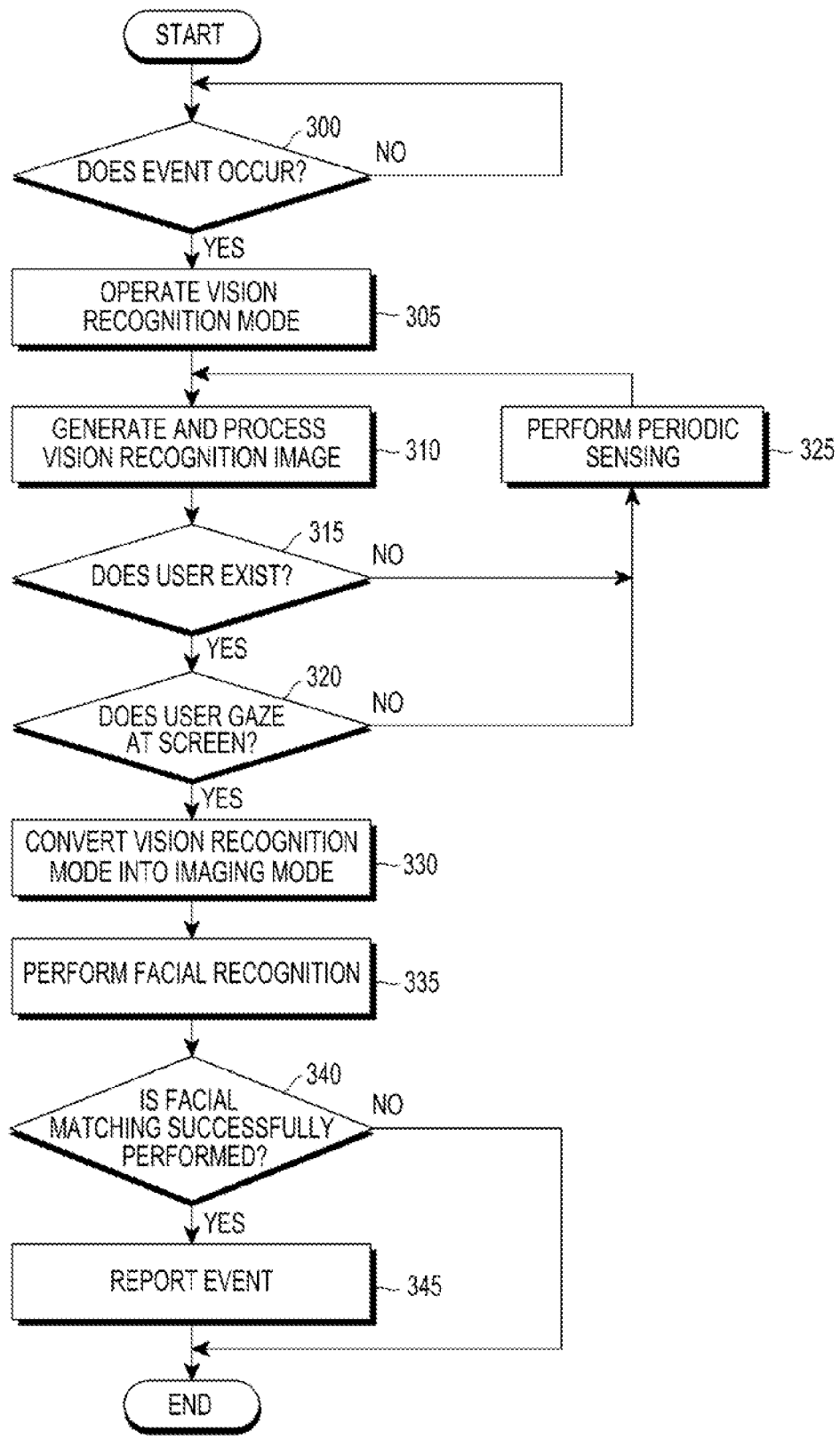
FIG. 3 illustrates operations of a mobile terminal according to an embodiment of the present invention.

Referring to FIG. 3, the mobile terminal determines whether an event occurs in step 300, and operates a vision recognition mode when the event occurs in step 305. The event is, for example, a missed call, reception of a text message, a notification sent from a smartphone application, and the like.

When the vision recognition mode is operated, the mobile terminal captures an image within a range of a forward vision of the mobile terminal so as to generate a vision recognition image, and processes the vision recognition image so as to detect and recognize a predetermined object or a gesture of the predetermined object from the vision recognition image. In this example, the vision recognition image is generated through use of a plurality of pixels as opposed to using all of the entire pixels and, thus, an operation process is faster than a conventional vision recognition scheme and is recognized with low power consumption.

The mobile terminal determines whether a user exists in the vision recognition image based on a result of the detection and recognition in step 315. That is, whether the predetermined object included in the vision recognition image corresponds to a person is determined. When the mobile terminal determines that the user does not exist in the vision recognition image in step 315, the mobile terminal performs periodic sensing in step 325, that is, may proceed with step 310 based on a predetermined period, so as to iteratively perform capturing, generating and processing of a vision recognition image, and the like.

Conversely, when the mobile terminal determines that the user exists in the vision recognition image in step 315, the mobile terminal proceeds to step 320 to determine whether the user is looking at a screen. To inform the user of the occurrence of an event through the screen, it is desirable that the user is looking at the screen. Whether the user is looking at the screen is determined from the recognition result through use of an eye-detection algorithm and the like.

When the user is not looking at the screen, the mobile terminal proceeds to step 325 to perform periodic sensing, and proceeds to step 310 to check whether the user gazes at the screen.

However, when it is determined that the user is looking at the screen in step 320, the mobile terminal converts the vision recognition mode into an imaging mode to generate a captured image with a high definition and a high pixel in step 330. The vision recognition mode is converted into the imaging mode only when a target (person) to which an event is to be reported exists and thus, power consumption is reduced as compared to other vision recognition schemes and a captured image with a high definition and a high pixel is provided.

In this manner, when the vision recognition mode is converted into the imaging mode, the captured image with the high definition and the high pixel is generated and thus, high level detection and facial recognition is performed through the use of the generated captured image in step 335. Facial matching is performed to determine whether a recognized face of the user in the captured image corresponds to a face of an allowed user. For example, whether the recognized face corresponds to a face of a user who is allowed to use the mobile terminal or a face of a user who is previously registered in a database, is determined. Accordingly, the mobile terminal determines whether the facial matching is successfully performed in step 340. When a matching face exists, the mobile terminal outputs the contents of an event for reporting in step 345.

According to the embodiments of the present invention, although an event occurs at multiple times, the event may not be reported to a user when the user is not in the proximity of the terminal, that is, when there is no need to report the event to the user. Therefore, when an event occurs again and the user exists, the event is then reported along with the previous events which were not reported. Accordingly, a screen that sequentially reports all the missed events is output only when the facial matching is successfully performed. As described in the foregoing, the mobile terminal determines whether a target to which an occurrence of an event is to be reported exists through use of a plurality of pixels of a captured image as opposed to using all of the entire pixels, and uses all of the entire pixels when the target exists and, thus, a predetermined function of the mobile terminal is controlled with low power consumption.

According to the embodiments of the present invention, the present invention extracts vision recognition information through use of a camera that is included in a mobile terminal or connected to an external side of the terminal that is capable of inputting and outputting information, such as, a portable phone, a TeleVision (TV), a Personal Computer (PC), a notebook, a digital sound source playback device, a PMP and the like, and controls the extracted information. Accordingly, the user readily and intuitively uses functions of the mobile terminal and thus, improves user experience. Also, the uniform controlling scheme of the mobile terminal is enhanced and thus, convenience in using the mobile terminal is improved. Moreover, a vision recognition image is extracted through the camera, and functions of determining existence of a user and recognizing a circumstance is performed based on the vision recognition image and thus, functions of the mobile terminal is operated with low power consumption.

The above-described embodiments of the invention may be embodied as hardware, software or a combination of hardware and software. Software is stored in a volatile or non-volatile storage device such as Read Only Memory (ROM) and the like irrespective of erasing or rewriting, a memory such as a Random Access Memory (RAM), a memory chip, a device, and a integrated circuit, or a storage medium that is capable of performing optical or magnetic recording and machine-reading such as Compact Disc (CD), Digital Versatile Disc (DVD), optical disc, magnetic tape, and the like. A storage unit that is included in a mobile terminal (or a user equipment) is an example of machine-readable storage media that are suitable for storing a program including instructions to implement the embodiments, or programs. Therefore, the invention includes a program including a code to implement an apparatus or a method claimed in a claim of the specification, and a machine-readable storage medium including the program, for example, a computer-readable storage medium. The program is transferred electronically through a medium such as a communication signal transferred through a wired or wireless connection, and the invention may appropriately include an equivalent medium.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of controlling a function of a mobile terminal through use of user interaction in the mobile terminal, the method comprising:
   operating in a vision recognition mode that generates a vision recognition image through use of signals output from a second plurality of pixels designated as vision pixels from among a first plurality of pixels of an image sensor included in the mobile terminal once a non-input event occurs in the mobile terminal, wherein a number of the second plurality of pixels is less than a number of the first plurality of pixels;
   determining whether an object in the vision recognition image using the second plurality of pixels corresponds to a person;
   determining a gesture of the object in the vision recognition image using the second plurality of pixels when the object corresponds to the person;
   when the gesture corresponds to a gesture of looking at a screen of the mobile terminal, converting the vision recognition mode into an imaging mode that generates a captured image through use of signals output from the first plurality of pixels of the image sensor; and
   performing a control function of the mobile terminal regarding the non-input event.

2. The method of claim 1, wherein performing the control function comprises outputting contents of the non-input event on the screen of the mobile terminal.

3. The method of claim 2, further comprising:
   performing facial recognition of the object in the imaging mode; and
   determining whether a result of the facial recognition corresponds to a face of a user who is authorized to use the mobile terminal,
   wherein the contents of the non-input event are outputted on the screen of the mobile terminal when the result corresponds to the face of the authorized user.

4. The method of claim 1, further comprising:
   generating vision recognition images at predetermined intervals, when the object is not the person; and
   determining whether an object included in each of the generated vision recognition images corresponds to the person.

5. A mobile terminal for controlling a function of the mobile terminal through use of user interaction, the mobile terminal comprising:
   an image sensor in which a second plurality of pixels from among a first plurality of pixels of the image sensor are designated as vision pixels, wherein a number of the second plurality of pixels is less than a number of the first plurality of pixels; and
   a controller configured to operate in a vision recognition mode that generates a vision recognition image through use of signals output from the second plurality of pixels designated as the vision pixels from among the first plurality of pixels of the image sensor once a non-input event occurs in the mobile terminal, to determine whether an object included in the vision recognition image using the second plurality of pixels corresponds to a person, to determine a gesture of the object in the vision recognition image using the second plurality of pixels when the object corresponds to the person, to convert the vision recognition mode into an imaging mode that generates a captured image through use of signals output from the first plurality of pixels of the image sensor when the gesture corresponds to a gesture of looking at a screen of the mobile terminal, and to perform a control function of the mobile terminal regarding the non-input event.

6. The mobile terminal of claim 5, further comprising:
a first digital signal converter for converting a signal output from each vision pixel into a digital signal;
a second digital signal converter for converting a signal output from each of the first plurality of pixels into a digital signal;
a first image processor for generating the vision recognition image through use of the digital signal converted by the first digital signal converter; and
a second image processor for generating the captured image by using the digital signal converted by the second digital signal converter.

7. The mobile terminal of claim 5, wherein the controller determines whether the non-input event occurs in the mobile terminal.

8. The mobile terminal of claim 5, wherein the controller performs facial recognition with respect to the object in the imaging mode, and determines whether a result of the facial recognition corresponds to a face of an allowed user.

9. The mobile terminal of claim 7, wherein the controller controls so that contents of the non-input event are output on the screen of the mobile terminal.

10. The mobile terminal of claim 5, wherein, when the object is not the person, the controller generates vision recognition images at predetermined intervals, and determines whether an object included in each of the generated vision recognition images corresponds to the person.

11. A method of controlling a function of a mobile terminal through use of user interaction in the mobile terminal, the method comprising:
operating in a first mode of generating a low pixel resolution image, once a non-input event occurs in the mobile terminal;
performing a recognition in the generated low pixel resolution image;
determining whether to convert the first mode of generating the low pixel resolution image into a second mode of generating a high pixel resolution image, based on a result of the recognition performed in the generated low pixel resolution image;
operating in the second mode of generating the high pixel resolution image, when it is determined to convert the first mode of generating the low pixel resolution image into the second mode of generating the high pixel resolution image; and
performing a control function of the mobile terminal regarding the non-input event using the generated high pixel resolution image.

12. The method of claim 11, further comprising:
continuing to operate in the first mode of generating the low pixel resolution image, when it is determined not to convert the first mode of generating the low pixel resolution image into the second mode of generating the high pixel resolution image.

13. The method of claim 11, further comprising:
performing a recognition in the generated high pixel resolution image; and
determining whether to performing the control function regarding the non-input event, based on a result of the recognition performed in the generated high pixel resolution image.

14. The method of claim 13, performing the control function comprises performing the control function of the mobile terminal regarding the non-input event, when it is determine to perform the control function.

* * * * *